US008749093B2

(12) United States Patent
Lee et al.

(10) Patent No.: US 8,749,093 B2
(45) Date of Patent: Jun. 10, 2014

(54) ELECTRIC RECEPTACLE MODULE

(75) Inventors: Yu-Lung Lee, Miaoli County (TW); Tsung-Chih Lin, New Taipei (TW)

(73) Assignee: Powertech Industrial Co., Ltd., New Taipei (TW)

( * ) Notice: Subject to any disclaimer, the term of this patent is extended or adjusted under 35 U.S.C. 154(b) by 635 days.

(21) Appl. No.: 13/032,765

(22) Filed: Feb. 23, 2011

(65) Prior Publication Data

US 2011/0304209 A1 Dec. 15, 2011

(30) Foreign Application Priority Data

Jun. 9, 2010 (TW) ................................ 99118726 A
Dec. 6, 2010 (TW) ................................ 99142364 A

(51) Int. Cl.
*H02J 3/14* (2006.01)

(52) U.S. Cl.
USPC ............................................................ 307/38

(58) Field of Classification Search
USPC ............................................................ 307/38
See application file for complete search history.

(56) References Cited

U.S. PATENT DOCUMENTS

| | | | | |
|---|---|---|---|---|
| 8,129,859 | B2 * | 3/2012 | Pien | 307/39 |
| 8,310,092 | B2 * | 11/2012 | Lee et al. | 307/38 |
| 2008/0309164 | A1 * | 12/2008 | Lim | 307/39 |
| 2012/0127637 | A1 * | 5/2012 | Byrne et al. | 361/627 |

FOREIGN PATENT DOCUMENTS

| | | | |
|---|---|---|---|
| CN | 2781598 | Y | 5/2006 |
| CN | 101064398 | A | 10/2007 |
| CN | 201018121 | Y | 2/2008 |
| CN | 101262708 | A | 9/2008 |
| CN | 101630797 | A | 1/2010 |
| CN | 101771219 | A | 7/2010 |
| GB | 2425225 | A | 10/2006 |
| KR | 10-2008-0093005 | A | 10/2008 |

* cited by examiner

*Primary Examiner* — Jared Fureman
*Assistant Examiner* — Duc M Pham
(74) *Attorney, Agent, or Firm* — Rosenberg, Klein & Lee

(57) ABSTRACT

An electric receptacle module is disclosed. The receptacle module includes a remote control device and a power outlet device. The remote control device has a signal transmission unit and an adjusting key. The signal transmission unit launches a timing signal when the adjusting key is pressed, and the adjusting key comprises a plus key and a minus key. The power outlet device has a signal receiving unit, a counting unit, a full-time power output interface and a timed power output interface. The power outlet device is configured to receive a power, the counting unit starts to count a predetermined time when the signal receiving unit receives the timing signal, the full-time power output interface supplies the power at all times, the timed power output interface supplies the power during the predetermined time.

12 Claims, 6 Drawing Sheets

ELECTRIC RECEPTACLE MODULE

BACKGROUND OF THE INVENTION

1. Field of the Invention

The present disclosure relates to an electric receptacle, especially to an electric receptacle module with a remote control device and a power outlet device.

2. Description of Related Art

Please refer to FIG. 1. FIG. 1 is a schematic diagram of a conventional electric receptacle apparatus with timer function. The electric receptacle apparatus 1 comprises a body 10 and a timer 12, wherein the timer 12 is disposed on the body 10, and the timer 12 can be a mechanical countdown timer. A user can set a countdown time by a turntable disposed on the timer 12 for controlling the electric receptacle apparatus 1 to supply a power for a period of time, so as to save the power consumption of an electrical device plugged into the electric receptacle apparatus 1.

However, for considering a cable distribution and an aesthetic appearance of circumstances, the electric receptacle apparatus 1 is positioned behind the electrical device or hidden under a desk. The user needs to move the electrical device or squat down before operating the timer 12. Therefore, it is inconvenient to operate the conventional electric receptacle apparatus with timer function.

SUMMARY OF THE INVENTION

An exemplary embodiment according to the present disclosure describes an electric receptacle module.

The electric receptacle module disclosed in one embodiment of the present disclosure includes a remote control device and a power outlet device, wherein the power outlet device is remotely controlled by the remote control device. The remote control device has a signal transmission unit and an adjusting key, wherein the signal transmission unit launches a timing signal when the adjusting key is pressed, and the adjusting key comprises a plus key and a minus key. The power outlet device has a signal receiving unit, a counting unit, a full-time power output interface and a timed power output interface, wherein the power outlet device is configured to receive a power, the counting unit starts to count a predetermined time when the signal receiving unit receives the timing signal, the full-time power output interface supplies the power at all times, the timed power output interface supplies the power during the predetermined time, the predetermined time will be increased when the plus key is pressed, and the predetermined time will be decreased when the minus key is pressed.

According to another exemplary embodiment of the present disclosure, an electric receptacle module is provided. The electric receptacle module includes a remote control device and a power outlet device, wherein the power outlet device is remotely controlled by the remote control device. The remote control device has a display unit, a signal transmission unit, an adjusting key, and a confirming key, wherein a predetermined time displayed on the display unit is adjustable according to pressing the adjusting key, and the remote control device launches a timing signal according to the predetermined time when the confirming is pressed. The power outlet device has a signal receiving unit, a counting unit, a full-time power output interface and a timed power output interface, wherein the power outlet device is configured to receive a power, the counting unit starts to count a predetermined time when the signal receiving unit receives the timing signal, the full-time power output interface supplies the power at all times, and the timed power output interface supplies the power during the predetermined time.

According to still another exemplary embodiment of the present disclosure, an electric receptacle module is presented. The electric receptacle module includes a remote control device and a power outlet device, wherein the power outlet device is remotely controlled by the remote control device. The remote control device has a signal transmission unit and a adjusting key, wherein the signal transmission unit launches a timing signal when the adjusting key is pressed, and the adjusting key comprises a plus key and a minus key. The power outlet device has a manipulating unit, a signal receiving unit, a counting unit, a full-time power output interface and timed power output interface, wherein the power outlet device is configured to receive a power, the counting unit starts to count a predetermined time when the signal receiving unit receives the timing signal, the full-time power output interface supplies the power at all times, the timed power output interface supplies the power during the predetermined time, the predetermined time will be increased when the plus key is pressed, the predetermined time will be decreased when the minus key is pressed, and the timed power output interface stop supplying the power when the manipulating unit is pressed.

According to still another exemplary embodiment of the present disclosure, an electric receptacle module is presented. The electric receptacle module includes a remote control device and a power outlet device, wherein the power outlet device is remotely controlled by the remote control device. The remote control device has a signal transmission unit and a adjusting key, wherein the signal transmission unit launches a timing signal when the adjusting key is pressed, and the adjusting key comprises a plus key and a minus key. The power outlet device has a manipulating unit, a signal receiving unit, a counting unit, a full-time power output interface and timed power output interface, wherein the power outlet device is configured to receive a power, the counting unit starts to count a predetermined time when the signal receiving unit receives the timing signal, the timed power output interface supplies the power during the predetermined time, the predetermined time will be increased when the plus key is pressed, the predetermined time will be decreased when the minus key is pressed, and the full-time power output interface and the timed power output interface stop supplying the power when the manipulating unit is pressed.

As mentioned above, the exemplary embodiments according to the present disclosure relate to the electric receptacle module capable of providing a convenient module for the user to set or adjust rapidly a continuous time of power supply, so as to save the power consumption of the electrical device in standby mode.

For further understanding of the invention, reference is made to the following detailed description illustrating the embodiments and examples of the invention. The description is only for illustrating the invention, not for limiting the scope of the claim.

BRIEF DESCRIPTION OF THE DRAWINGS

The drawings included herein provide further understanding of the invention. A brief introduction of the drawings is as follows.

DETAILED DESCRIPTION OF THE PREFERRED EMBODIMENTS

Figure 1:
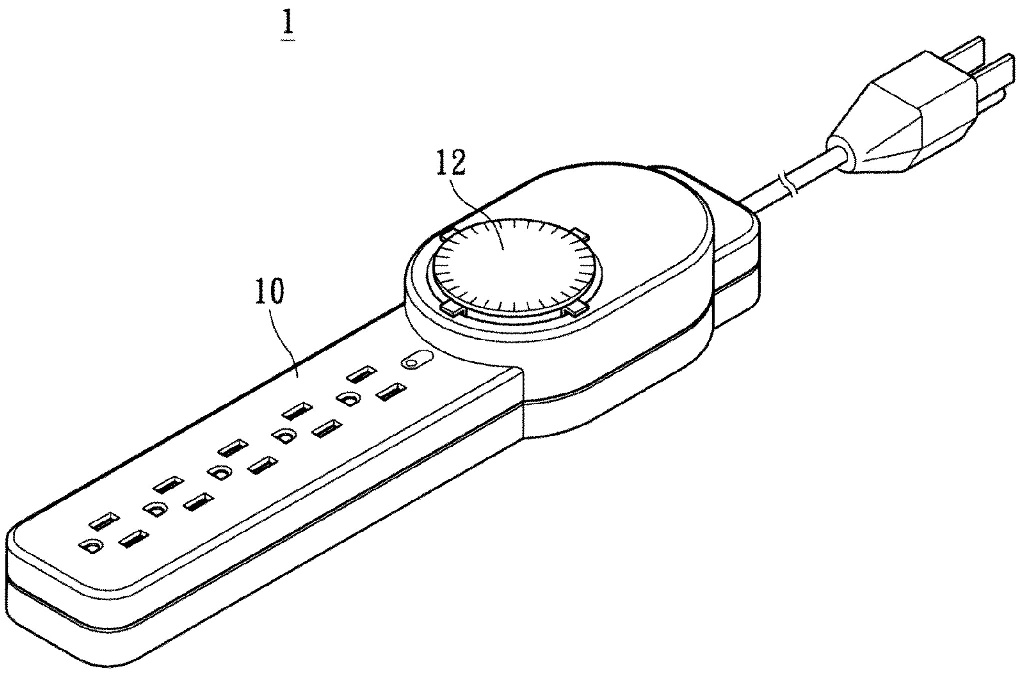
FIG. 1 PRIOR ART
FIG. 1 is a schematic diagram of a conventional electric receptacle apparatus with timer function.
Figure 2:
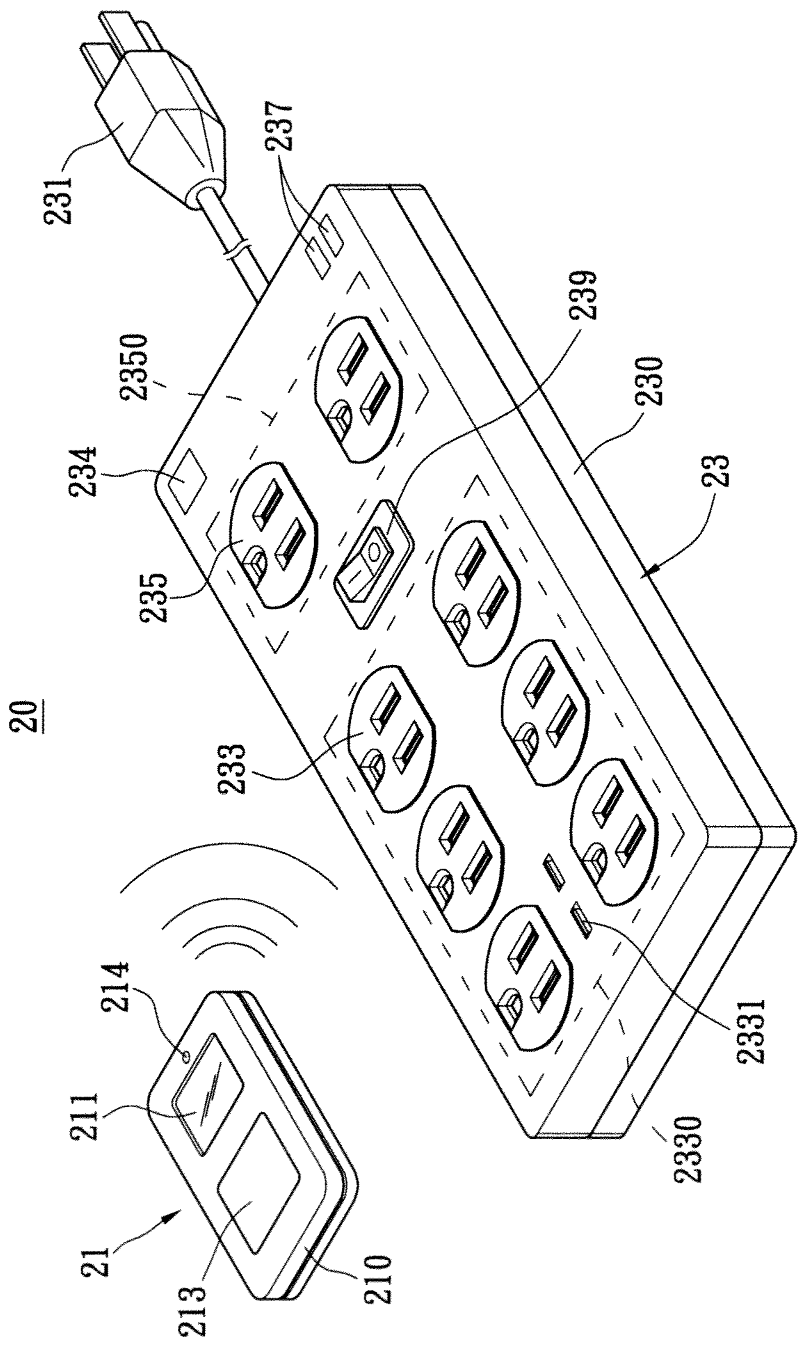
FIG. 2 is a schematic diagram of an electric receptacle module according to an exemplary embodiment of the present disclosure.

Refer to FIG. 2. FIG. 2 is a schematic diagram of an electric receptacle module 20 according to an exemplary embodiment of the present disclosure. The electric receptacle module 20 includes a remote control device 21 and a power outlet device 23. The power outlet device 12 has a timed power output interface 223, wherein the timed power output interface 223 supplies a power for a continuous time is determined by the remote control device 21. The remote control device 21 may control the power outlet device 23 via a wireless communication technology The remote control device 21 includes a body 210, a display unit 211, an input unit 213 and a signal transmission unit 214. The display unit 211, the input unit 213, and the signal transmission unit 214 are disposed on the body 210. The power outlet device 23 includes a casing 230, a power input interface 231, a signal receiving unit 234, a full-time power output interface 235, an indicating unit 237, and a manipulating unit 239. the power input interface 231, the timed power output interface 233, the signal receiving unit 234, the full-time power output interface 235, the indicating unit 237 and the manipulating unit 239 are disposed on the casing 230.

The input unit 213 may be a plurality or physical buttons or a touch panel. The input unit 213 is configured to receive an external operation from a user for determining the power outlet device 23 supplies the power for a predetermined time. The external operation may be pushing or touching the input unit 213 by the user according to a working hour of an electrical device plugged into the power outlet device 23. The remote control device 21 transfers the predetermined time to a timing signal and launches the timing signal via the signal transmission unit 214. The timing signal contains the predetermined time.

The display unit 211 may be a liquid crystal display for indicating information corresponded to the external operation. The remote control device 21 controls the display unit 211 to display the predetermined time according to the external operation. Actually, the display unit 211 may also be integrated with the input unit 213 into a touch panel display.

The signal transmission unit 214 and the signal receiving unit 234 may be a radio frequency communication module via a certain communication protocol at an effective distance. Therefore, the electric receptacle module 20 provides the user to easily operate the remote control device 21 and rapidly setting the power outlet device 23 to supply the power for the predetermined time.

The power outlet device 23 may be a power strip as illustrated in the FIG. 2. The type of the power outlet device 23 is not restricted herein and the power outlet device 23 may also be a wall-type outlet or an adaptor outlet. The power input interface 231 may be an alternative current plug with a power cord and is plugged into a jack of a wall-type socket or a power supply device for receiving the power. The full-time power output interface 235 and the timed power output interface 233 are may be alternative current sockets with two or three holes for supplying the power to the electrical device plugged into them.

More specifically, the timed power output interface 233 supplies the power for a period of time is controlled by the remote control device 21. In other words, the period of time is equaled to the predetermined time and the timed power output interface 233 dose not supply the power except for the predetermined time. On the other hand, the full-time power output interface 235 supplies the power at all times.

When the power outlet device 23 receives a timing signal via the signal receiving unit 234, the power outlet device 23 controls the timed power output interface 233 to start to supply power and the power outlet device 23 starts to count elapsed time or countdown remaining time according to the predetermined time in the timing signal. When the power outlet device 23 counts or countdowns completely, the power outlet device 23 stops the timed output interface 233 supplying the power.

The power outlet device 23 may merely include the timed power output interface 233 and the signal receiving unit 234. The timed power output interface 233 may be a plurality of sockets, and the sockets supply power for a period of time determined by the remote control device 21 at the same time or respectively.

In one complementation, the indicating unit 237, manipulating unit 237 and the full-time power output interface 253 may be auxiliary units. The indicating unit 237 may be an audio-broadcasting unit or a light-emitting unit. The audio-broadcasting unit is such as amplifier for outputting an indicating signal per hour corresponded to counting. The indicating signal may be a variable sound such as a short high sound. When the power outlet device 23 is about to count completely, the frequency of the short high sound will be increased for reminding the user. The light-emitting unit is such as light-emitting diode lighting for outputting an indicating signal such as a variable color of light. For example, when the power outlet device 23 starts to count, the indicating signal is a green light, and when counting is about to be completed, the indicating signal is a red light.

The indicating unit 237 may also output the indicating signal when the power outlet device 23 receives the timing signal.

The manipulating unit 237 may a switch button is configured to receive the external operation from the user for controlling the timed power output interface 233 to supply power or stop supplying power. When the remote control device 21 is out of battery or lost, or the user want to change a schedule of supplying power of the timed power output interface 233, the user may control the timed power output interface 233 to supply power or stop supplying power manually via the manipulating unit 237.

The full-time power output interface 235 and the timed power output interface 233 are adapted for different electrical devices respectively. For example, a refrigerator or a security device required uninterruptible power supply is arranged to be plugged into the full-time power output interface 235, a computer operated in a working time is arranged to be plugged into the timed power output interface 233.

In order to let the user recognize the full-time power output interface 235 and the timed power output interface 233, the power outlet device 23 has a timed area 2330 and an always-on area 2350 distributed on the casing 230. The timed power output interface 233 is positioned in the timed area 2330, and the full-time power outlet interface 233 is positioned in the always-on area 2350. The timed area 2330 and the always-on area 2350 are labeled with different colors, different patterns, different frame lines, or different characters for indicating the user to plug different electrical device into the power outlet device 23. In one complementation, the power outlet device 23 further comprises a direct current power output interface 2331 positioned in the timed area 2330 for supplying a DC power to a small-scale electrical device. The direct current power output interface 2331 is also controlled by the remote control device 21.

Therefore, the power outlet device 23 has the full-time power output interface 235 and the timed power output interface 233 at the same device. The user may turn on the timed power output interface 233 for supplying the power for the predetermined time by the remote control device 21, and the timed power output interface 233 stops supplying the power after the predetermined time automatically. The user also may operate the power outlet device 23 manually via the manipulating unit 239 for control the power outlet device 23 to supply the power or stop supplying the power.

Figure 3:
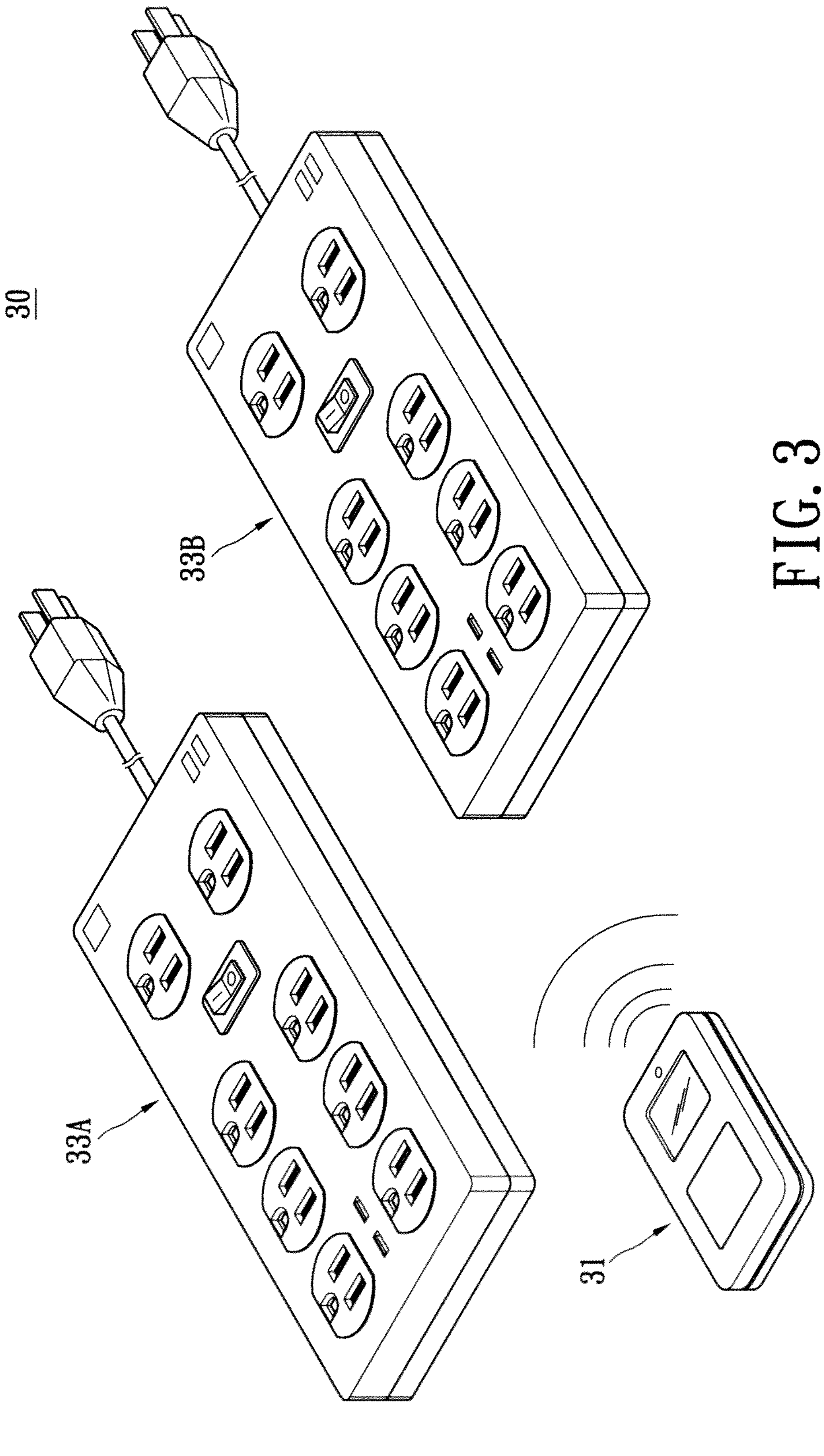
FIG. 3 is a schematic diagram of an electric receptacle module according to another exemplary embodiment of the present disclosure.

Refer to FIG. 3. FIG. 3 is a schematic diagram of an electric receptacle module according to another exemplary embodiment of the present disclosure. The electric receptacle module 30 and the electric receptacle module 20 are roughly the same. The difference between them is the electric receptacle module 30 includes a remote control device 31 and a plurality of power outlet devices 33A, 33B. The quantity of the power outlet devices 33A, 33B is not restricted herein, and the quantity of the power outlet devices 33A, 33B is determined for matching with the remote control device 31 according to the users demand.

The power outlet devices 33A, 33B may be installed in different floor or area in a house. The user may control the power outlet devices 33A, 33B by the remote control device 31 for saving the stand-by power of the electrical devices plugged in the power outlet devices 33A, 33B respectively.

Figure 4:
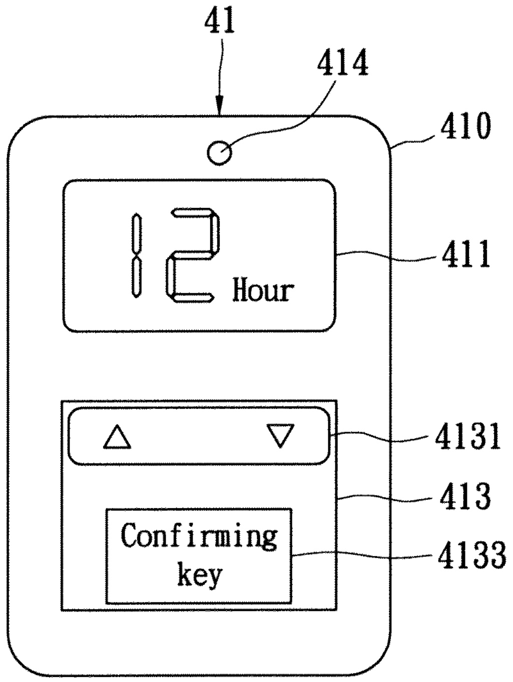
FIG. 4 is a schematic diagram of a remote control device of an electric receptacle module according to another exemplary embodiment of the present disclosure.

Refer to FIG. 4. FIG. 4 is a schematic diagram of a remote control device of an electric receptacle module according to another exemplary embodiment of the present disclosure. The remote control device 41 includes a body 410, a display unit 411, an input unit 413 and a signal transmission unit 414. The signal transmission unit 414 is disposed on a front-end of the body 410, and the display unit 411 and the input unit 413 are disposed on one side of the body 410. The position of the signal unit 414, the display unit 411 and the input unit 413 are not restricted herein.

The input unit 413 may a plurality of physical buttons including an adjusting key 4131 and a confirming key 4133. The adjusting key 4131 includes a plus key and a minus key for providing the user to set or adjust the predetermined time. For example, when the plus key of the adjusting key 4131 is pressed, the remote control device 41 launches the timing signal to the power outlet device (not shown) via the signal transmission unit 414 for increasing the predetermined time by one hour each time. On the contrary, when the minus key of the adjusting key 4131 is pressed, the remote control device 41 launches the timing signal via the signal transmission unit 414 for decreasing the predetermined time by one hour each time. The predetermined time is adjusted in hour, day or month.

The predetermined time is flickeringly displayed on the display unit 411 at a certain frequency until the confirming key 4133 is pressed. When the confirming key 4133 is pressed, the remote control device 41 launches the timing signal via the signal transmission unit 414 and the predetermined time always on the display unit 411. The expression of the predetermined time is not restricted herein.

Additionally, the confirming key 4133 may also a turn-off key. When the confirming key 4133 is pressed repeatedly or continuously for a while, the remote control device 41 launches a turn-off signal to the power outlet device for stopping the timed power output interface supplying the power.

Figure 5:
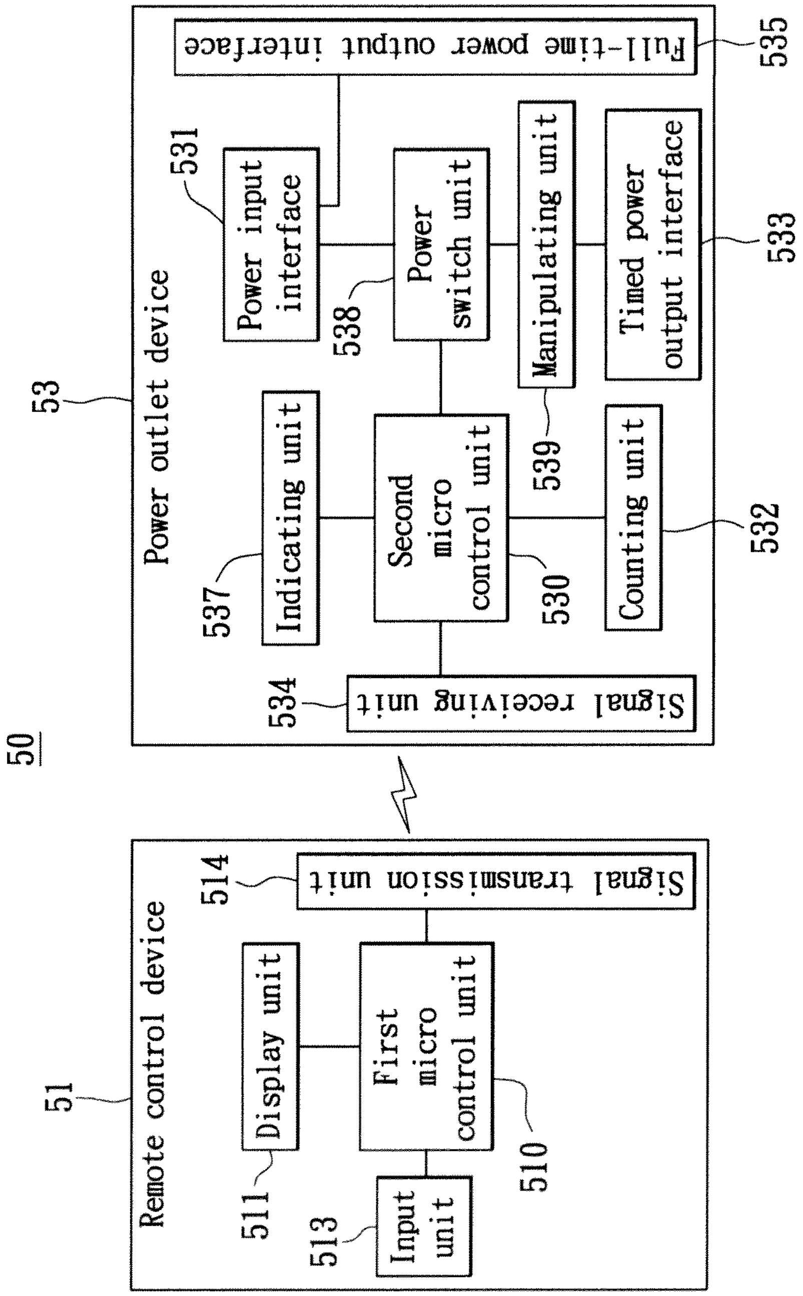
FIG. 5 is a block diagram of an electric receptacle module according to another exemplary embodiment of the present disclosure.

Refer to FIG. 5. FIG. 5 is a block diagram of an electric receptacle module according to another exemplary embodiment of the present disclosure. The electric receptacle module 50 is configured to represents signal transmission and transformation in abovementioned electric receptacle module 20 or 30. The electric receptacle module 50 includes the remote control device 51 and the power outlet device 53. The remote control device 51 controls the power outlet device 53 wirelessly.

The remote control device 51 includes a first micro-control unit 510, a display unit 511, an input unit 513 and a signal transmission unit 514. The display unit 511, the input unit 513 and the signal transmission unit 514 are electrically connected with the first micro-control unit 510 respectively. The first micro-control unit 510 is installed in the body (not shown) of the remote control device 51.

The power outlet device 53 includes a second micro-control unit 530, a power input interface 531, a counting unit 531, a timed power output interface 533, a signal receiving unit 534, a full-time power output interface 535, an indicating unit 537, a power switch unit 538 and a manipulating unit 539. The counting unit 532, the signal receiving unit 534, the indicating unit 537 and the power switch unit 538 are electrically connected with the second micro-control unit 530. The power switch unit 538 is electrically connected between the power input interface 531 and the timed power output interface 533. The manipulating unit 539 is electrically connected between the power switch unit 538 and the timed power output interface 533. The full-timed power output interface 535 is electrically connected with the power input interface 531. The second micro-control unit 530, the counting unit 531 and the power switch unit 538 are installed in the casing (not shown) of the power outlet device 53.

The input unit 513 is configured to receive an external operation and output a command signal to the first micro-control unit 510 according to the external operation. The first micro-control unit 510 obtains the predetermined time according the command signal. The command signal may be an adjusting signal or a confirming signal. When the command signal is the adjusting signal, the first micro-control unit 510 controls the display unit 511 to display the adjusted predetermined time. When the command signal is the confirming signal, the first micro-control unit 510 controls the signal transmission unit 514 to transfer the predetermined time into the timing signal, and the signal transmission unit 514 launches the timing signal, wherein the timing signal contains the predetermined time.

The power input interface 531 is configured to receive the power, and the full-time power output interface 535 is configured to output the power from the power input interface 531 at all times. The power switch unit 538 may operate in a short-circuit condition or a open-circuit condition for controlling the power input interface 531 to connect to or separate from the timed power output interface 533.

The second micro-control unit 530 controls the power switch unit 538 to operate in the short-circuit condition when receiving the timing signal via the signal receiving unit 534. At the same time, the second micro-control unit 530 controls the counting unit 532 to start to count the predetermined time. The second micro-control unit 530 controls the power switch unit 538 to operate in the open-circuit condition when the counting unit 531 counts the predetermined time completely.

The second micro-control unit 530 also controls the indicating unit 537 to output an indicating signal according to counting result of the counting unit 532. The indicating signal may be a variable sound or light.

The manipulating unit 539 may be a switch or a push button and operate in an open condition or a closed condition according the external operation for controlling the power input interface 531 to connect to or separate from the timed power output interface 533. When the manipulating unit 539 operates in the closed condition, the timed power output interface 533 stops supplying the power.

The manipulating unit 539 may also electrically connected between the power input interface 531 and the power switch unit 538 for interrupting the power passing through the power switch unit 538. The timed power output interface 533 is out of controlled by the remote control device 51. Therefore, the user may force the timed power output interface 533 to stop supplying the power.

Additionally, the manipulating unit 539 may also electrically connected between the power input interface 531 and the full-time power output interface 535, and the power switch is electrically connected to the manipulating unit 539. Therefore, the user may force the full-time power output interface 535 to stop supplying the power.

Figure 6:
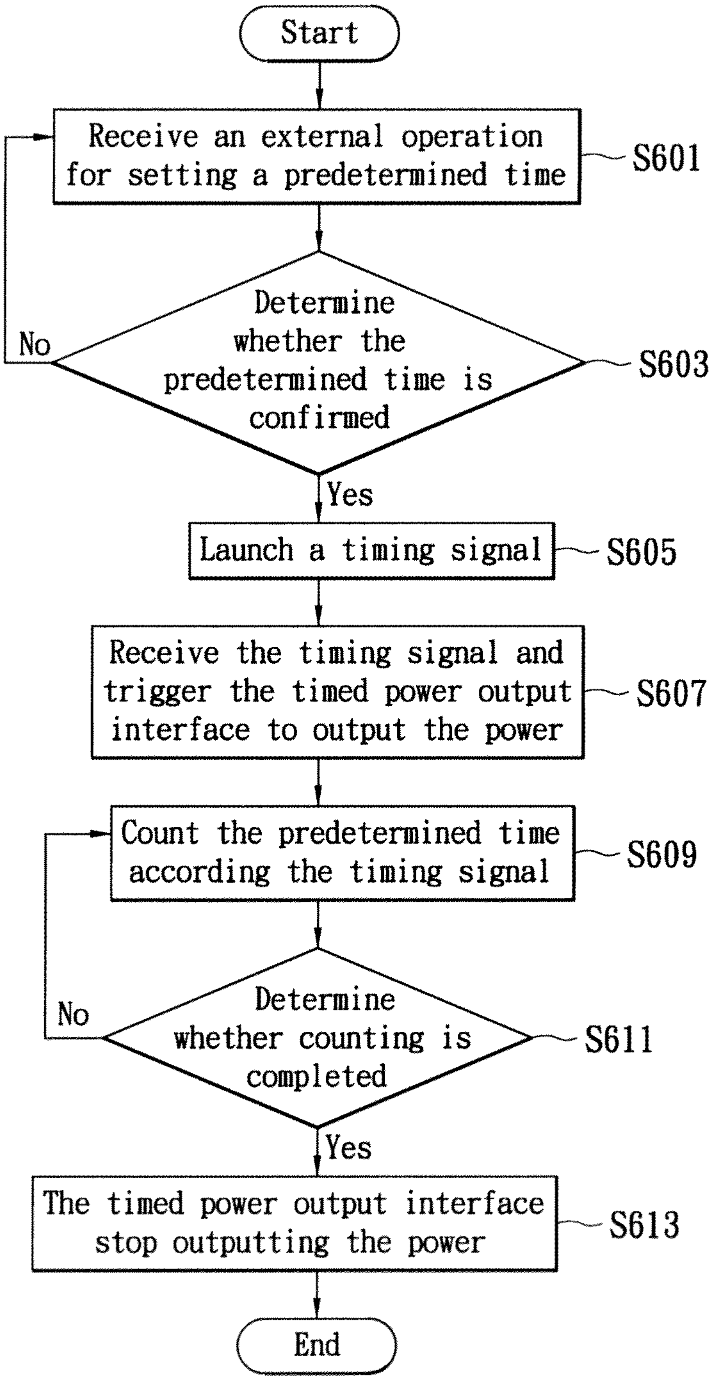
FIG. 6 is a flow chart of a method for operating an electric receptacle module according to an exemplary embodiment of the present disclosure.

FIG. 6 is a flow chart of a method for operating an electric receptacle module according to an exemplary embodiment of the present disclosure.

The method for operating the electric receptacle module is adapted for the abovementioned electric receptacle module 20, 30, or 50. The steps of the method for operating the electric receptacle module are disclosed as following.

In the beginning, the power outlet device 23 is electrically connected to the power via the power input interface 231. The remote control device 21 receives the external operation via the input unit 213 (S601). The input unit 213 transfers the external operation into the command signal, and the remote control unit 21 obtains the predetermined time according to the command signal.

The remote control unit 21 determines whether the predetermined time is confirmed according to the command signal (S603). When the remote control unit 21 determines the predetermined time is not confirmed, the remote control unit 21 still receives the external operation (S601).

When the remote control device 21 determines the predetermined time is confirmed, the remote control device transfers the predetermined time into the timing signal and launches the timing signal to the power outlet device 23 via the signal transmission unit 214 (S605). The timing signal may contain the predetermined time.

When the power outlet device 23 is far from the remote control device 21 in a required distance, the power outlet device 23 receives the timing signal from the remote control device 21 via the signal receiving unit 234. The power outlet device 23 controls the timed power output interface 233 to start to supply the power received from the power input interface 231 (S607).

When the power outlet device 23 receives the timing signal, the power outlet device 23 starts to count the predetermined time (S609).

The power outlet device 23 determines whether counting is completed according to the counting result (S611). When the power outlet device 23 does not count completely, the power outlet device 23 still counts.

When the power outlet device 23 counts for the predetermined time, the power outlet device 23 controls the timed power output interface 233 to stop supplying the power (S5613).

To sum up, the exemplary embodiments according to the present disclosure relate to the electric receptacle module and the method for operating the electric receptacle module capable of providing a convenient module for the user to set or adjust rapidly a continuous time of power supply, so as to save the power consumption of the electrical device in standby mode.

Some modifications of these examples, as well as other possibilities will, on reading or having read this description, or having comprehended these examples, will occur to those skilled in the art. Such modifications and variations are comprehended within this invention as described here and claimed below. The description above illustrates only a relative few specific embodiments and examples of the invention. The invention, indeed, does include various modifications and variations made to the structures and operations described herein, which still fall within the scope of the invention as defined in the following claims.

What is claimed is:

1. An electric receptacle module, comprising:

a remote control device, having a signal transmission unit, an adjusting key and a confirming key, wherein a predetermined time is adjustable according to pressing the adjusting key, and the remote control device launches a timing signal according to the predetermined time when the confirming key is pressed, and the adjusting key comprises a plus key and a minus key; and a power outlet device, remotely controlled by the remote control device, in which the power outlet device has a signal receiving unit, a counting unit, a full-time power output interface and a timed power output interface, wherein the power outlet device is configured to receive a power, the counting unit starts to count the predetermined time when the signal receiving unit receives the timing signal, the full-time power output interface supplies the power at all times, the timed power output interface supplies the power during the predetermined time, the predetermined time will be increased when the plus key is pressed, and the predetermined time will be decreased when the minus key is pressed;

wherein the remote control unit launches a turn-off signal to the power outlet device when the confirming key is pressed repeatedly or continuously for a while, and the timed power output interface stops supplying the power.

2. The electric receptacle module as in claim 1, wherein the remote control device comprises:

a body, in which the signal transmission unit is disposed on the body;

an input unit, disposed on the body, for receiving an external operation, and outputting a command signal according to the external operation;

a display unit, disposed on the body; and a first micro-control unit, installed in the body, in which the micro-control unit is coupled with the input unit, the display unit and the signal transmission unit, wherein the first micro-control unit is configured to obtain the predetermined time according to the command signal and control the display unit to display the predetermined time, and the signal transmission unit is configured to transfer the predetermined time to the timing signal and launch the timing signal to the power outlet device.

3. The electric receptacle module as in claim 2, wherein the power outlet device comprises:

a casing, in which the signal receiving unit, the full-time power output interface and the timed power output interface are disposed on the case; and a power input interface, disposed on the casing, for receiving the power;

a power switch unit, coupled with the power input interface and the timed power output interface, in which the power switch unit is configure to operate in a short-circuit condition or a open-circuit condition, for controlling the power input interface to electrically connect to or separate from the timed power output interface; and a second micro-control unit, coupled with the signal receiving unit and the power switch unit, in which the second micro-control unit is configured to receive the timing signal, and control the power switch unit to operate in the short-circuit condition for a continuous time according to the timing signal, and the continuous time is equal to the predetermined time.

4. The electric receptacle module as in claim 2, wherein the second micro-control unit is coupled with the counting unit, in which the second micro-control unit controls the counting unit to start to count the predetermined time when the second micro-control unit receives the timing signal, and the second micro-control unit controls the power switch unit to operate in the open-circuit condition after the predetermined time elapsed.

5. The electric receptacle module as in claim 4, further comprising an indicating unit, in which the indicating unit is disposed on the casing and coupled with the second micro-control unit, wherein the second micro-control unit is configured to control the indicating unit to output a indicating signal according to a counting result of the counting unit.

6. The electric receptacle module as in claim 5, wherein the indicating unit is an audio-broadcasting unit or a light-emitting unit.

7. The electric receptacle module as in claim 3, wherein the timed power output interface is labeled with color, pattern, frame line, or character.

8. An electric receptacle module, comprising:

a remote control device, having a display unit, a signal transmission unit, an adjusting key, and a confirming key, wherein a predetermined time displayed on the display unit is adjustable according to pressing the adjusting key, and the remote control device launches a timing signal according to the predetermined time when the confirming key is pressed; and a power outlet device, remotely controlled by the remote control device, in which the power output device has a signal receiving unit, a counting unit, a full-time power output interface and a timed power output interface, wherein the power outlet device is configured to receive a power, the counting unit starts to count the predetermined time when the signal receiving unit receives the timing signal, the full-time power output interface supplies the power at all times, and the timed power output interface supplies the power during the predetermined time;

wherein the remote control unit launches a turn-off signal to the power outlet device when the confirming key is pressed repeatedly or continuously for a while, and the timed power output interface stops supplying the power.

9. The electric receptacle module as in claim 8, wherein the adjusting key comprises a plus key and a minus key, wherein the predetermined time displayed on the display unit will be increased when the plus key is pressed, the predetermined time displayed on the display unit will be decreased when the minus key is pressed, and the predetermined time is flickeringly displayed on the display unit at a certain frequency before the manipulating unit is pressed.

10. The electric receptacle module as in claim 9, wherein the full-time power output interface and the timed power output interface are alternative current sockets with two or three holes, and the full-time power output interface and the timed power output interface are labeled with different colors, different patterns, different frame lines, or different characters.

11. An electric receptacle module, comprising:

a remote control device, having a signal transmission unit, and a adjusting key and a confirming key, wherein a predetermined time is adjustable according to pressing the adjusting key, and the remote control device launches a timing signal according to the predetermined time when the confirming key is pressed, and the adjusting key comprises a plus key and a minus key; and a power outlet device, remotely controlled by the remote control device, in which the power outlet device has a manipulating unit, a signal receiving unit, a counting unit, a full-time power output interface and timed power output interface, wherein the power outlet device is configured to receive a power, the counting unit starts to count the predetermined time when the signal receiving unit receives the timing signal, the full-time power output interface supplies the power at all times, the timed power output interface supplies the power during the predetermined time, the predetermined time will be increased when the plus key is pressed, the predetermined time will be decreased when the minus key is pressed, and the timed power output interface stop supplying the power when the manipulating unit is pressed;

wherein the remote control unit launches a turn-off signal to the power outlet device when the confirming key is pressed repeatedly or continuously for a while, and the timed power output interface stops supplying the power.

12. An electric receptacle module, comprising:

a remote control device, having a signal transmission unit; a adjusting key and a confirming key, wherein a predetermined time is adjustable according to pressing the adjusting key, and the remote control device launches a timing signal according to the predetermined time when the confirming key is pressed, and the adjusting key comprises a plus key and a minus key; and a power outlet device, remotely controlled by the remote control device, in which the power outlet device has a manipulating unit, a signal receiving unit, a counting unit, a full-time power output interface and timed power output interface, wherein the power outlet device is configured to receive a power, the counting unit starts to count the predetermined time when the signal receiving unit receives the timing signal, the timed power output interface supplies the power during the predetermined time, the predetermined time will be increased when the plus key is pressed, the predetermined time will be decreased when the minus key is pressed, and the full-time power output interface and the timed power output interface stop supplying the power when the manipulating unit is pressed;

wherein the remote control unit launches a turn-off signal to the power outlet device when the confirming key is pressed repeatedly or continuously for a while, and the timed power output interface stops supplying the power.

* * * * *